Feb. 2, 1954  M. G. WHITE  2,668,286
MOVING OBJECT SELECTIVE DETECTION SYSTEM
Filed Oct. 23, 1943
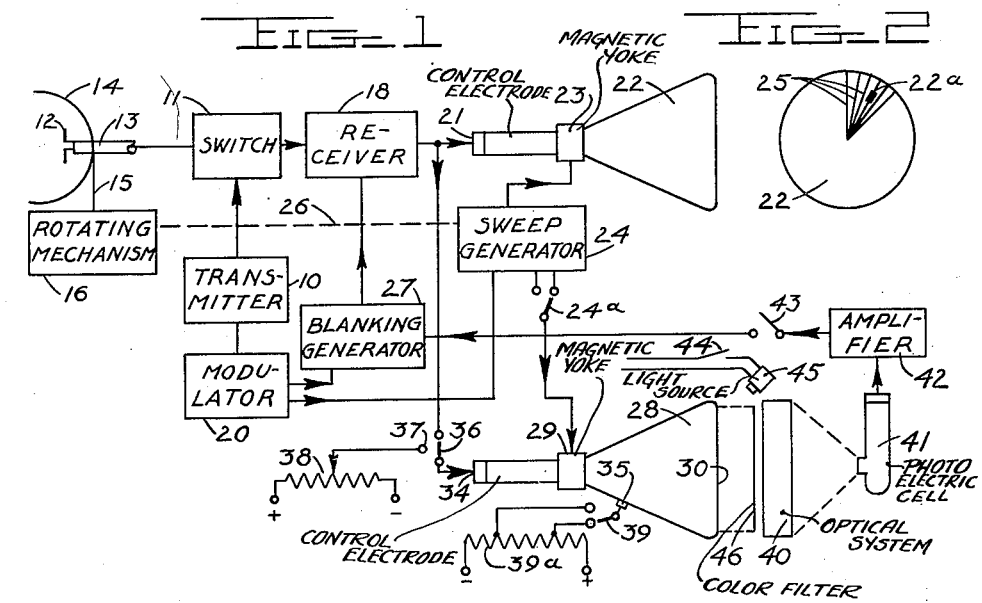
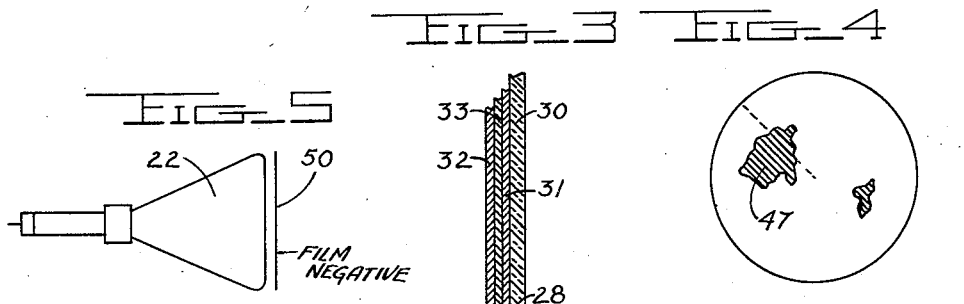
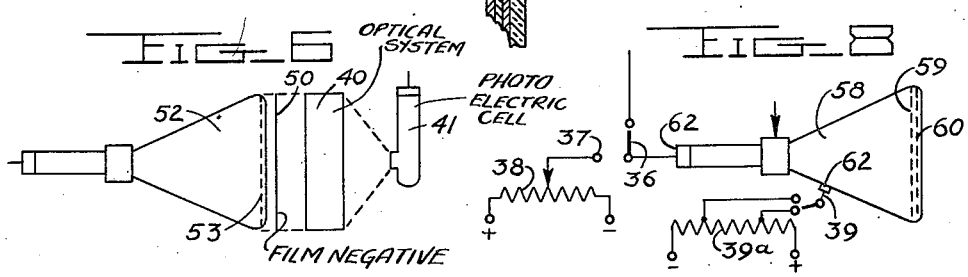
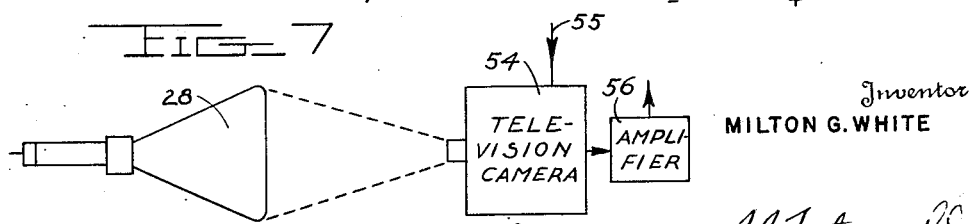
Inventor
MILTON G. WHITE Patented Feb. 2, 1954

2,668,286

UNITED STATES PATENT OFFICE 2,668,286

MOVING OBJECT SELECTIVE DETECTION SYSTEM

Milton G. White, Cambridge, Mass.

Application October 23, 1943, Serial No. 507,463

15 Claims. (Cl. 343—7.7)

This invention relates to radio echo detection systems and particularly to a method and apparatus for improving the indication in such systems.

One system of radio-echo detection which has been successfully used comprises a transmitter and associated antenna system for radiating a beam of electromagnetic radiation into space toward the horizon and rotating the beam about a substantially vertical axis, so as to scan the horizon in repeated cycles. The radiation is modulated, so as to form discrete pulses and is reflected back from objects within the field of scanning which intercept the radiation, causing the electron beam of a cathode ray tube to be intensified, so as to produce spots of light on the face of the tube. The electron beam of the cathode ray tube is caused to sweep radially of the tube from the center toward the circumference each time a pulse of radiation is transmitted by the antenna, and the direction of the radial sweep is caused to rotate about the center in synchronism with the rotation of the scanning electromagnetic beam.

Since the speed of the electromagnetic radiation through space is known, the spacing of the pulses of radiation and the timing of the sweeps of the electron beam in the cathode ray tube are so chosen that any signal reflected back from an object in space will intensify the electron beam before the beam reaches the circumference of the cathode ray tube if the object is within the predetermined range of the apparatus. Thus, a spot of light appearing on the face of the cathode ray tube will represent an object in space, the distance from the center of the tube corresponding to the distance the object is away from the transmitter and the angle of the particular radial line upon which the spot occurs with respect to a predetermined reference line on the face of the tube corresponding to the angle of the electromagnetic beam with respect to a predetermined reference direction.

The cathode ray tube of such a radio echo detection system will show a picture which is substantially a map of the region surrounding the antenna. If the scanning is done over a body of water, islands will appear in their natural positions as well as other prominent points of land, and, in addition, ships will also appear upon the screen as well as airplanes or other moving objects. There may be a very great number of objects within the field being scanned, some large, and some small, with the result that a great mass of spots of light of varying degrees of intensity and size will appear on the face of the tube. It is very advantageous to be able to distinguish between those echo signals which are produced by permanent stationary objects, as, for instance, islands, jutting rocks, points of land, lighthouses, and permanently located ships, and the echo signals caused by moving objects such as ships or airplanes. This is not always easy to do, especially where a great many signals are reproduced on the face of the tube.

Accordingly, it is one of the objects of the present invention to provide a system of radio echo detection in which echo signals produced by moving objects may be distinguished from those produced by stationary objects.

Another object of the invention is to provide auxiliary apparatus for a system of radio-echo detection by means of which the operator may view at will the complete indication, including all of the radio-echo signals, or only those produced by moving or temporary objects.

A more specific object of the invention is to provide a method and an apparatus by means of which a permanent record of the objects in the field being scanned, or a record which may be maintained for any desired relatively long time period, may be produced, and the signals included in this permanent or semi-permanent record may be used to eliminate corresponding signals on the face of the indicating tube, so that only those signals which represent objects which have come into the field since the making of the permanent or semi-permanent record will appear on the face of the tube.

Still another more specific object of the invention is to provide a system of radio-echo detection in which is used an auxiliary cathode ray tube upon the face of which the echo signals may be recorded for an indefinite period of time, the system being provided with means to utilize this more or less permanent record to blank out the receiver of the system, or otherwise render the electron beam of the indicator tube insensitive, whenever it sweeps over a point on the main indicating tube corresponding to the point on the auxiliary tube occupied by one of the recorded signals.

Other objects and objects relating to various modifications of the several parts of the apparatus as well as variations in the manner of carrying out the desired results will be apparent as the description of the invention proceeds.

The invention is illustrated in the accompanying drawings in which:

Fig. 1 is a schematic diagram of a complete system showing one embodiment of the invention;

Fig. 2 is a front view of the main indicating cathode ray tube included in the arrangement of Fig. 1;

Fig. 3 is an enlarged sectional view through the face of the recording cathode ray tube used in the arrangement of Fig. 1;

Fig. 4 is a front view of the recording cathode ray tube of Fig. 1;

Fig. 5 is a schematic view illustrating a modified form of the invention, and

Figs. 6, 7 and 8 are schematic views illustrating still other modified forms of the invention.

Referring now more specifically to Fig. 1 a radio echo detection system is shown in which high frequency oscillations are produced in a transmitter 10 and transmitted through a switch 11 to an antenna 12 by means of a suitable transmission line 13.

The oscillations may be such as are usually measured in centimeters, and the antenna 12 may be any suitable type of radiator as, for instance, a dipole, for radiating the energy at the particular frequency used. The radiation from the antenna 12 may be redirected in any desired manner, as, for instance, by means of the reflector 14 which may be a paraboloid with the antenna 12 mounted adjacent the focus of the paraboloid in such a manner as to produce a concentrated beam of radiation which will extend outwardly, toward the left in the figure, substantially on the axis of the reflector. The antenna system, including the antenna 12 and the reflector 14, is mounted in some suitable manner so that it may rotate about the vertical axis 15 driven by suitable rotating mechanism 16, the arrangement being such that, in the particular radio echo detection system disclosed, the radiated electromagnetic beam will rotate continuously about the axis 15. The vertical inclination of the beam may be set, as desired.

In the system disclosed, the same antenna system 12—14 is used to receive the echo signals reflected back from objects within the scanned field, and for this reason the switch 11 is used for automatically effectively connecting the transmitter to the antenna and disconnecting the receiver when the transmitter is operating, and effectively connecting the receiver to the antenna and disconnecting the transmitter when the transmitter is not operating. Such a switch may be of the discharge type, as more fully disclosed in the application of James L. Lawson filed March 18, 1943, Serial Number 479,662, for Protection of Receiver Against Overload.

In the particular example disclosed, the transmitter 10 is not operated continuously but transmits only discrete pulses of oscillations to the antenna 12, being completely off between adjacent pulses. The pulses produced by the transmitter are controlled by a modulator 20 which may have any suitable circuit for producing square pulses and which delivers these square pulses to the transmitter at a predetermined repetition rate of, for example, 1000 or more, depending somewhat on the range of the apparatus, since there must be a sufficient time between adjacent pulses to permit the echo signals to come back from the objects in space before the next pulse is transmitted.

The indicating device for the particular system shown in Fig. 1 is a cathode ray tube 22, the position of whose electron beam may be controlled either electrostatically or electromagnetically. The latter type of control has been indicated by a yoke 23 which is shown surrounding the neck of the tube and contains magnetic deflecting coils connected to a sweep generator 24 by means of which they are suitably energized. In the particular system shown, the sweep generator 24 produces a radial sweep of the electron beam of the tube from the center of the tube out towards the circumference, as indicated by the several lines 25 in Fig. 2, and this radial sweep is rotated about the center of the tube in synchronism with the rotation of the antenna system 12—14. To this end, a suitable linkage, either mechanical or electrical, between the rotating mechanism 16 and the sweep generator 24 is provided, as has been indicated by the dotted line 26. A blanking generator 27 may be provided for producing a blanking pulse which may be used to control the electron beam of the cathode ray tube so as to prevent intensification of the beam except during the time the beam is following the radial sweep. Such a blanking generator may be controlled by the modulator 20, and is shown connected to the receiver 18, where it may be connected to one or more control grids therein, although it will be understood that it may also be connected to the cathode ray tube in any manner permitting the blanking pulse to control the intensity of the beam. An electrical system for producing this particular type of sweep for the electron beam of a cathode ray tube has been shown and described in the application of James F. Koehler, filed May 16, 1945, Serial Number 594,045 for a Cathode Ray Tube Sweep Circuit, now U. S. Patent 2,637,026.

That part of the apparatus described above constitutes a radio-echo detection system which has been successfully operated and which may be used with the present invention. In operation, the transmitter 10 transmits pulses of high-frequency oscillations to the antenna 12 under control of the modulator 20, the switch 11 acting effectively to connect the transmitter to the antenna 12 during these pulses. Discrete pulses of electromagnetic radiation are therefore radiated from the antenna system 12—14 in a relatively concentrated beam which is caused continuously to rotate about the vertical axis 15, thus repeatedly scanning a 360° angle of the horizon.

When a pulse of radiation strikes an object within the field, the radiation is reflected back and will arrive at the antenna 12 at some time during the interval between the originating radiated pulse and the next succeeding pulse, depending on the distance the object is away from the antenna. With rapid pulsing and with relatively slow rotation of the antenna, the echo signal will return before the antenna has moved appreciably, and the received echo signal will be directed by the switch 11 into the receiver 18 and the response of the receiver 18 will be delivered to the control-electrode 21 of the cathode ray tube 22 or will be otherwise utilized to intensify the electron beam of the tube, so as to produce a spot of light, as, for instance, the spot 22a on the face of the tube.

Meanwhile, as each pulse of radiation is radiated from the antenna 12 the electron beam of the cathode ray tube is caused to sweep from the center towards the circumference thereof on one of the radial lines 25, the particular line corresponding to the particular direction of the antenna at the time the radiated pulse leaves it. Thus, the spot of light produced by the response of the receiver will appear on the face of the tube 22 a distance from the center corresponding to the time it took the electron beam to move from the center to the point where the light appears, and the position of the spot of light will therefore correspond to the range of the object. At the same time the radial line 25 on which the spot of light appears will have an angle with respect to a reference line on the face of the tube, as, for instance, a vertical line through the center, which will be equal to the angle the electromagnetic beam makes with a predetermined reference line for the electromagnetic beam, as, for instance, a line straight ahead of the operator. Various objects lying within the field of scan will therefore appear as spots of light distributed over the face of the tube. The blanking pulse delivered by the blanking generator 27 will prevent any signal from affecting the tube 22 except during the radial sweep, so that the electron beam can be brought to the center of the tube again ready for the next sweep without affecting the indication.

A cathode ray tube is preferably chosen which has a sufficiently persistent fluorescent screen to retain a spot of light on the face of the tube for the period of the scanning cycle, so that a substantially steady image is produced.

In accordance with thhe invention, I provide means to record more or less permanently the objects within the scanned field and to compare this record at a later time with the object then appearing within the field. One manner of making this record utilizes an auxiliary cathode ray tube 28 which may be of the electromagnetic deflection type, having a magnetic yoke 29 which is provided with the same type of sweep currents from the sweep generator 24 with which the yoke 23 of the main indicator tube 22 is provided. The electron beam in the tube 28 will therefore sweep in exactly the same manner and at the same rate and sequence as the electron beam in the tube 22. The tube 28, however, differs from the tube 22 in having a special screen applied to the face of the tube. In Fig. 3 an enlarged fragmentary section of the flat end 30 of the tube 28 is shown. A screen 31 on the inner surface of the glass is composed of a semi-transparent or translucent layer of some material, as, for instance, one or more of certain of the alkali halides, which become deeply colored under electron bombardment and may remain so colored until steps are taken to erase the coloration. Such a material may be sodium chloride, which produces an orange color, potassium chloride, which produces a magenta color, potassium bromide, which produces a greenish, blue color, rubidium chloride, which produces a blue color, or caesium chloride, which produces a greenish blue color. Of these materials, perhaps potassium chloride and potassium bromide give the deepest colors and have been used most successfully. This material may be applied to the inner surface of the flat end 30 of the tube in a known manner, as, for instance, by evaporating the material from a nickel boat mounted within the tube. A second screen 32 formed of a layer of a fluorescent material having a very short persistency such as any material commonly used in cathode ray tubes for producing a short persistence fluorescent screen, is then applied over the layer 31. In some instances a layer 33 of some semi-transparent or translucent neutral material may be applied between the screens 31 and 32 to separate them. The effect of the screens 31 and 32 will be subsequently described.

The control grid 34 of the cathode ray tube 28 may be connected to the receiver 18 through a two-way switch 36 which may have another terminal 37 connected to the arm of a potentiometer 38 the resistance of which is connected across a suitable source of potential, as indicated, so that by throwing the switch 36 over to the terminal 37 the receiver 18 is cut-off from the control grid of the tube 28 and a constant potential, as determined by the potentiometer 38, is applied to the control grid. Means is provided to change the velocity of the electrons so that they will penetrate the screen 31 or not, as desired. To this end the terminal 35 for the accelerating electrode of the tube 38 is connected to a switch 39 having two contacts connected to different sources of potential, as, for instance, the voltage dividing circuit 39a. With the switch 39 in the position shown, a sufficiently high potential is applied to the accelerating electrode to cause the electrons to penetrate the screen 31, while with the switch in the other position, the electrons will affect the screen 32 but their velocity will be insufficient for them to reach the screen 31.

Because of the change in velocity of the electrons, the deflection currents and perhaps the wave forms of these currents may also have to be changed correspondingly, since it takes more current to move the electron beam through a given angle when the velocity of the electrons is increased and the change in current may necessitate a slightly different wave form. This may be done by suitable circuits in the sweep generator 24 under control of the switch 24a, shown connecting the deflecting yoke 29 with either of two terminals on the sweep generator 24. With the switch in the position shown, the sweep currents will be sufficient to produce the desired result at the increased electron velocity. With the switch in the other position, reduced sweep currents are provided to maintain the sweep at constant amplitude in spite of reduced electron velocity.

In front of the cathode ray tube 28 I provide an optical system 40 which is arranged to focus any light from the face 30 of the tube 28 upon the light sensitive electrode of a photoelectric cell 41 which may preferably be of the electron multiplier type. The output of this cell is delivered to an amplifier 42 which amplifies signals received by the photo-electric cell and delivers them through a switch 43 to the blanking generator 27, so as to supply the receiver 18 with additional blanking pulses which render the electron beam of the tube 22 insufficient to produce spots of light on the face of the tube in a manner and for a purpose to be subsequently described.

In the operation of the apparatus including the tube 28 the echo signals from the receiver 18 are applied to the control grid 34 of the tube 28, the switch 43 from the amplifier 42 being open, as indicated. The switch 39 is in the position shown which will provide suitable potential on the accelerating electrode to give the electrons sufficient velocity to penetrate the screen 31. The various circuit connections for the other electrodes of the tube 28 have been omitted for clearness. The response of the receiver 18 will then control the number of electrons reaching the screen 31. This screen, as has been already mentioned, is a special screen which will become deeply colored under electron bombardment, and hence the echo signals will produce darkly colored spots on this screen which will remain there for relatively long periods of time, or until they are erased, as by subjecting the face of the tube for a few minutes to intense light with a simultaneous weak bombardment of electrons, or to heat at about 100° centigrade.

In order to produce this more or less permanent record of the objects appearing within the scanned field, the tube 28 may be left connected, as indicated in Fig. 1, for a period of several complete cycles of the scanning of the antenna 12—14, although it may be left on longer if desired. Then the switches 36, 39, and 24a, which may be ganged together, may be thrown to their other positions. Throwing the switch 36 applies a constant potential to the control electrode of the tube 28, instead of the signals from the receiver. Throwing the switch 39 applies a lower potential to the accelerating electrode to reduce the velocity of the electrons and prevent them from penetrating the screen 31 but permitting them to affect the screen 32. Thowing the switch 24a maintains the scanning action in spite of the change in electron velocity. The deflecting circuits, however, are not changed otherwise, and hence the sweep of the electron beam continues as before, duplicating that of the electron beam in the tube 22.

The electron beam striking the screen 32 produces a pin point of light which, because of the constant potential on the control electrode, will sweep across the tube following the movement of the electron beam in the tube 22 but without being modulated with any signal. However, the pin point of light produced by the electron beam will be visible through the layer 33, screen 31, and the glass 30, except at portions where the screen 31 has been darkened by the previous period of exposure when the velocity of the electrons was sufficient to penetrate to the screen 31 under control of the receiver response. If the pin point of light therefore moves, as, for instance, along the dotted line 46 of Fig. 4, the light will penetrate the face of the tube until it reaches a dark portion 47 which has previously been recorded on the screen 31 from a signal received by reflection from an island, for instance, which is located in the scanned field. As the pin point of light crosses this dark portion 47 in the screen 31, the light passing out of the face of the tube will be materially reduced, but when the pin point of light leaves the outer edge of the dark portion 47, light will pass through the face of the tube as before. All of the light will come from the face 30 of the tube, as before.

All of the light coming from the face 30 of the tube 28 is focused by means of the optical system 40 upon the light sensitive electrode of the photo-electric cell 41, and, as the electron beam continues to scan within the tube, the light falling upon the photo-electric cell 41 will be modulated in accordance with the dark spots recorded on the screen 31 which correspond to the objects within the scanned field.

The switch 43 is then closed, connecting the amplifier 42 to the blanking generator, which then blanks out the receiver 18 at intervals of time corresponding to the time required for the electron beam in the tube 28 to cross the dark spots on the screen 31 of that cathode ray tube, or, in other words, at times when the electron beam of the tube 22 is crossing a point or area on the face of the tube 22 where an object in space would normally be indicated. The amplifier 42 is preferably a direct current amplifier, since there may be large spots of light or dark color on the screen 31 which will keep the photoelectric cell illuminated or darkened for relatively long periods of time.

The result of this arrangement is that all of the signals which correspond to the signals received when the permanent record was made are eliminated from the face of the tube 22 or reduced in intensity, and this tube will therefore show up any objects appearing within the field of scan of the electromagnetic beam which have moved into that field subsequently to the making of the permanent record. Such new objects appearing within the field can immediately be identified on the face of the tube 22. If then the operator desires to locate the new object, which has appeared within the field with respect to some object, as, for instance, the island 47 which appears on the permanent record, he has only to open the switch 43, whereupon the blanking generator will no longer deliver the blanking pulses to the receiver 18 which correspond to the permanently recorded objects within the field, and hence the receiver 18 will deliver to the cathode ray tube 22 all of the echo signals which are picked up from objects within the field. Therefore, the island 37 will appear again on the cathode ray tube 22, together with all other objects within the field of scan. By closing and opening the switch 43 several times the operator may compare the movement of the newly arrived object with the other permanent objects and can much more easily distinguish between new objects and permanent objects.

In some instances a color filter 46 may be positioned in front of the tube 28, so that the light from the tube 28 must pass through it to reach the photo-electric cell 41. This color filter 46 is such as to absorb the particular color produced by electron bombardment on the screen 31, as, for instance, magenta, where the screen 31 is made of potassium chloride. This will prevent light which filters through the darkly colored portions of the screen from reaching the photoelectric cell 41.

If it is desired to erase the permanent record from the screen 31, the operator has only to close a switch 44 which energizes a source 45 of intense light, the source being placed so that the light can illuminate the face of the tube. At the same time he adjusts the potentiometer 38 so as to subject the screen 31 to weak electron bombardment. A few minutes of this treatment will remove the record from the screen 31 and the operator may then make another permanent record of the field being scanned and repeat the process of observing objects coming into the field subsequently to the making of the record. Alternatively, the operator may erase the record by subjecting the face of the tube in any desired manner for a few minutes to a temperature of about 100 degrees centigrade.

The use of the special cathode ray tube 28 for producing the permanent record of the objects within the scanned field may be preferred, since by means of it the record may be easily changed and also it may be easily compared with the indication on the face of the tube 22. However, in certain instances I may use a more simplified method which will give good results under certain conditions. I may photograph the face of the tube 22 when all the objects in the scanned field appear indicated thereon, and I may then use the negative plate or film to aid in differentiating between the old signals and objects which have entered the field subsequently to the time the photograph was taken. This arrangement is illustrated in Fig. 5 in which the cathode ray tube 22 is shown with a negative film 50 positioned in front of it. It will be understood that signals normally appearing as light spots on the face of the cathode ray tube 22 will appear as dark spots on the negative film. Hence, if the face of the cathode ray tube 22 is viewed through this negative film, which has the same scale as the image on the face of the tube, the dark spots on the film which correspond to the permanent objects within the field will tend to block out the light from these same objects on the face of the tube 22, so that new objects appearing in the field subsequently to the taking of the photograph will stand out as light spots on the face of the tube.

I may also utilize a photographic film in another manner to attain the objects of the invention, as indicated in Fig. 6. Here is shown a cathode ray tube 52 which may take the place of the tube 28 in Fig. 1 and which may be similar to that tube, except that the long persistent screen 31 and the intervening layer 33 are eliminated, leaving only a very short persistent screen 53. In front of the face of this tube 52 is placed the photographic negative 50 upon which all of the permanent objects located within the scanned field appear as dark spots. The tube 52 is then used similarly to the tube 28, the electron beam producing a pin point of light which sweeps across the face of the tube in coincidence with the movement of the electron beam in the tube 22. Light from the face of the tube 52 is focused by means of the optical system 40 upon the photo-electric cell 41 which operates in the manner of Fig. 1, delivering its impulses to the amplifier 42 whence they are delivered to the blanking generator 27 which blanks out the receiver 18 during the periods when the photo-electric cell 41 does not receive light, these periods being determined by the positions of the dark spots on the photographic negative 50.

In Fig. 7 a modified form of the invention is shown in which the tube 28 may be used, but instead of concentrating the light produced thereby into a photo-electric cell 41 as in Fig. 1, a television camera 54 is used to pick up the image of the face 30 of the tube 28. This television camera may be any suitable type of television pick-up apparatus, but the scanning should of course correspond to the scanning of the tube 28 and hence should be controlled by the sweep generator 24 through a suitable connection shown at 55. The output of the television camera may be delivered to an amplifier 56 the output of which is then used to contro lthe blanking generator, so that the receiver 18 is blanked out and the electron beam of the cathode ray tube 22 prevented from producing a spot of light on the face of the tube whenever the electron beam of the television camera scans a dark spot on the face of the tube 28.

In place of the tube 28 in the arrangement of Fig. 7, a photographic negative, similar to the negatives 50 of Figs. 5 and 6, with a suitable light source behind it, may be used, or even a positive transparency of the permanent record, since the amplifier of the television camera may be arranged to reverse the signal, so that the effect on the blanking generator is the same as though a negative film were used in front of the television camera. In this case, also, the television camera will scan a permanent record of the field scanned by the electromagnetic radiation.

In the arrangement of Fig. 1 it is necessary to use a tube 28 which has an inner screen 32 of a material having a very short persistency of fluorescence, so that the fluorescence will not lag behind the electron beam and the only light produced by the fluorescent screen will be that produced at the instance of bombardment by the electron beam. If this were not so, light from another portion of the face of the tube might be reaching the photo-electric cell 41 when the electron beam was crossing a dark spot on the screen 31. However, in certain instances, I may eliminate entirely the optical system 40 and photo-electric cell 41 and associated equipment and provide a tube 58, as shown in Fig. 8, which may be similar to the tube 28 except that the inner screen 59 has a longer persistency of fluorescence which may be in the order of the time of one antenna revolution. The outer screen 60 may be the same as the screen 31 in the tube 28. By means of the switch 39 between the terminal 62 for the accelerating electrode and the voltage dividing circuit 39a, the voltage on the accelerating electrode may be given a value to cause the electron beam of the tube to penetrate to the screen 60 for the production upon that screen of the record of the objects within the scanned field, in the manner already described in connection with the tube 28, or to reduce the velocity of the eelctrons in the beam so that they will not reach the screen 60 but will produce the indication of the objects within the scanned field upon the screen 59. With the switch 39 in the second position, the observer can look directly at the face of the tube 58, and the dark spots produced by the earlier made record, representing the objects in the field of scan which have been permanently recorded upon the screen 60, will obscure or greatly reduce the light produced on the inner screen 59 by the electron beam which is modulated by the signal. Other objects coming into the field subsequently to the making of the permanent record will appear as brighter spots and will be more easily identifiable. The color filter 46 of Fig. 1 may be used with this arrangement to enhance the effect.

If desired, the switch 36 may be used with this arrangement to disconnect the signal from the cathode ray tube and apply a constant potential to the control grid thereof, so as to scan the screen 59 with a pin point of light. Thereupon the permanent record which has already been made upon the screen 60 will appear as a silhouette. Throwing the switch 36 to connect the signal again will cause the new or temporary objects appearing in the field of scan to appear on the face of the tube as bright spots. The operator can thus distinguish the new objects from the permanent ones.

While the invention has been disclosed in connection with a particular type of indication, as, for instance, that which produces a map of the region being scanned, it will be understood that other types of indication may also be used. For instance, the movement of the electron beam in a horizontal direction may correspond to the azimuth of the radiated electromagnetic beam and the movement in a vertical direction may correspond to range, or the movement in a horizontal direction may correspond to range and the movement in a vertical direction to elevation where the field is being scanned in these two directions.

It is also not essential to move the electron beams in the tubes 28 and 52 of Figs. 1 and 6 in coincidence with that of the tube 22. As long as the rate of movement of the electron beam in the auxiliary tube is the same as that in the tube 22, any pattern may be scanned in the auxiliary tube, provided that pattern is repeated every time the cycle of scanning in the tube 22 is repeated. Thus, the image appearing on the face of the tube 28 may be entirely unintelligible and yet will supply the necessary blanking pulses to remove the recorded objects from the indication on the tube 22.

The invention also has been shown in connection with a system which utilizes discrete pulses of radiation, but it should not be limited to such a system, because it is applicable to any system in which objects within a particular scanned field are reproduced on an indicating device.

Many modifications may be made in the arrangements shown and described without departing from the spirit of the invention, and I do not therefore wish to be limited to what has been shown and described except as such limitations appear in the appended claims.

What I claim and desire to secure by Letters Patent is:

1. A system of radio-echo detection comprising, in combination, means to produce a relatively concentrated beam of electromagnetic radiation, means to cause said beam to scan a predetermined field about a predetermined axis, means to receive radiation reflected back from objects within said field, a first cathode ray tube, a first screen on the face of said cathode ray tube capable of being darkly colored when bombarded by electrons and to hold the color for a relatively long period of time, a second screen on the face of said cathode ray tube between said first screen and the other elements of said tube capable of fluorescing when bombarded by electrons and having a short persistency of fluorescence, means to cause the electron beam of said tube to scan the face of said tube repeatedly through a predetermined point on the face thereof, means to cause the movement of said electron beam to rotate about said predetermined point in synchronism with the movement of said electromagnetic beam about said axis, means to maintain the velocity of the electrons in said electron beam, so that said electrons will penetrate said second screen and a said first screen when said electron beam is intensified a predetermined amount, means to cause said received radiation to intensify said electron beam said predetermined amount, whereupon dark spots are produced on said first screen corresponding to objects in said field reflecting said electromagnetic radiation, said dark spots remaining for an indefinite time after said reflected radiation is received, means thereafter to remove the effect of said reflected radiation from said electron beam and to maintain said beam at constant intensity sufficient to cause it to affect said second screen but not said first screen, a second cathode ray tube, means to cause the electron beam of said second cathode ray tube to scan the face of said tube in synchronism with the movement of the electron beam in said first cathode ray tube, means to cause said received radiation to modulate the intensity of said electron beam in said second cathode ray tube, and means to cause the effect of said constant intensity electron beam in said first tube scanning across said second screen thereof to reduce the intensity of the electron beam in said second cathode ray tube whenever the electron beam in said first cathode ray tube crosses a point on the face of said tube corresponding to a recorded spot on said first screen.

2. A system of radio-echo detection comprising, in combination, means to produce a relatively concentrated beam of electromagnetic radiation, means to cause said beam to scan a predetermined field about a predetermined axis, means to receive radiation reflected back from objects within said field, a cathode ray tube, means to cause the electron beam of said cathode ray tube to sweep repeatedly through a predetermined point on the face of said tube, means to cause the direction of said sweep to rotate about said predetermined point in synchronism with the movement of said electromagnetic beam about said axis, means to cause said received radiation to modulate the intensity of said electron beam, whereby spots of light appear on the face of said tube corresponding to objects located within said field and at points corresponding to their natural location, a light sensitive screen upon which has been made a dark record of the objects within said field when said record was made, said objects being positioned on said screen in locations corresponding to the natural location of said objects in said field appearing on said face of said tube, and means to position said screen in front of the face of said tube with the objects appearing thereon aligned with the same objects appearing on the face of said tube, whereby the brightness of the objects on the face of said tube which correspond to the objects on said screen is greatly reduced.

3. A system of radio-echo detection comprising, in combination, means to produce a relatively concentrated beam of electromagnetic radiation, means to cause said beam to scan a predetermined field in space about a predetermined axis, means to receive radiation reflected back from objects within said field, a first cathode ray tube, means to cause the electron beam of said first cathode ray tube repeatedly to sweep through a predetermined point on said tube, means to cause the sweep of said electron beam to rotate about said predetermined point in synchronism with the movement of said electromagnetic beam about said axis, means to cause said received radiation to modulate the intensity of said electron beam whereby spots of light will appear on the face of said cathode ray tube corresponding to the objects located within said field, a second cathode ray tube, a screen on the face of said second cathode ray tube capable of being darkly colored under electron bombardment and of maintaining said coloration for long periods of time, a second inner screen on the face of said cathode ray tube capable of fluorescing when bombarded by electrons and having short persistency of fluorescence, means to cause the electron beam of said second cathode ray tube to sweep across the face of said second tube in synchronism with the movement of the electron beam of said first cathode ray tube, means to cause said received radiation to modulate the intensity of said electron beam in said second cathode ray tube, means to control the velocity of the electrons in said second cathode ray tube, so as to cause said beam to penetrate said inner screen and affect said outer screen, or to affect said inner screen without penetrating to said outer screen, means to remove the effect of said received radiation from said electron beam and maintain said electron beam at constant intensity, a light sensitive cell, optical means to focus light from the face of said second cathode ray tube upon said light sensitive cell, and means to utilize the output of said light sensitive cell to modulate the electron beam of said first cathode ray tube.

4. A system of radio-echo detection comprising, in combination, means to produce a relatively concentrated beam of electromagnetic radiation, means to cause said beam to scan a predetermined field in space about a predetermined axis, means to receive radiation reflected back from objects within said field, a first cathode ray tube, means to cause the electron beam in said first cathode ray tube repeatedly to sweep through a predetermined point on the face of said tube, means to cause the direction of movement of said electron beam to rotate about said predetermined point in synchronism with the movement of said electromagnetic beam about said axis, means to cause said received radiation to modulate the intensity of the electron beam in said first cathode ray tube, a second cathode ray tube, means to cause the electron beam in said second cathode ray tube to scan the face of said tube in a predetermined manner, switching means coupled to said second cathode ray tube for alternatively connecting said second cathode ray tube to said receiving means, so that the response of said receiving means can control the intensity of said electron beam, or to a source of fixed potential which maintains said electron beam at a constant intensity, a screen containing a record of the objects within said field, each of said objects being represented by a dark spot which is located on said screen in such a manner as to intercept light produced by the electron beam of said second cathode ray tube when the electron beam of said first cathode ray tube is producing a spot of light upon the screen of said first cathode ray tube which corresponds to the particular object, a photo-electric cell, means to concentrate light from the face of said second cathode ray tube through said screen upon said cell, and means to utilize the output of said photo-electric cell to reduce the intensity of the electron beam of said first cathode ray tube when said electron beam is at positions corresponding to objects included in said record.

5. A system of radio-echo detection comprising, in combination, means to produce a relatively concentrated beam of electromagnetic radiation, means to cause said beam to scan a predetermined field in a predetermined manner, means to receive radiation reflected back from objects within said field, a cathode ray tube, a first screen within said cathode ray tube capable of being darkly colored when bombarded by electrons and of holding the color for a relatively long period of time, a second screen within said cathode ray tube between said first screen and the other elements of said tube, said second screen being capable of fluoresing when bombarded by electrons and having a short persistency of fluorescence, means to cause the electron beam of said tube to scan said second screen in a predetermined manner with respect to the scanning of said electromagnetic beam, means to maintain the velocity of electrons in said electron beam so that said electrons will penetrate said second screen and affect said first screen, means to cause said received radiation to modulate said electron beam, whereupon dark spots of color are produced on said first screen corresponding to objects in said field reflecting said electromagnetic radiation, said dark spots remaining for an indefinite time after said reflected radiation is received, means thereafter to remove the effect of said reflected radiation from said electron beam and to maintain said beam at constant intensity, means to alter the velocity of said electrons so as to cause said beam to affect said second screen but not said first screen, a color filter positioned in front of the face of said cathode ray tube and being capable of absorbing light of the color of said darkly colored spots, and means to cause the light passing through said color filter when said constant intensity electron beam is scanning said inner screen to modulate the signal produced by said reflected radiation so as to reduce those parts of said signal corresponding to fixed objects within said field of scan.

6. The method of detecting a moving object in a region of fixed objects by radio waves which comprises the steps of directively radiating radio wave pulses, scanning said region while radiating said pulses, receiving wave pulses reflected from fixed objects in the region being scanned at time intervals lying between the periods of pulse radiation, producing a visual indication of said received pulses, preparing a photographic negative of said indication, and superimposing said negative over said visual indication of subsequent reflected wave pulses whereby the indication of pulses not present during a predetermined number of previous scanning operations are readily visually indicated.

7. The method of detecting a moving object in a region of fixed objects by radio waves which comprises the steps of directively radiating radio wave pulses, scanning said region while radiating said pulses, receiving wave pulses reflected from objects in the region being scanned at time intervals lying between the periods of pulse radiation, producing continuously a visual indication of light and dark areas in accordance with the location of said objects in said region, producing a substantially stable record of the location of stationary objects in said region from said indication, and combining said record with said indication to eliminate the indication of the location of stationary objects whereby reflected wave pulses which were not recorded during a predetermined number of previous scanning operations are readily indicated.

8. The method of detecting a moving object in a region of fixed objects by radio waves which comprises the steps of directively radiating radio wave pulses, scanning said region while radiating said pulses, receiving wave pulses reflected from fixed objects in the region being scanned at time intervals lying between the periods of pulse radiation, producing a spot of light, scanning an area with said spot of light in a predetermined manner, intensifying said spot of light in accordance with said received wave pulses, preparing a photographic negative of said area, and superimposing said negative over said scanned area effectively to reduce the intensity of said spot of light whenever it corresponds in location to objects included in said negative.

9. A system of radio-echo detection comprising, in combination, means for directively radiating radio wave pulses, means for scanning a field while radiating said pulses, means for receiving wave pulses reflected from objects in the region being scanned, first and second cathode ray tubes, means coupling said receiving means to said first and second cathode tubes to indicate on the faces thereof by light areas the location of said objects, means associated with said second cathode ray tube for making a light-sensitive record of the location of said light areas, the said light areas appearing as dark areas on said record, light-sensitive means responsive to said record to produce a modulating signal, and means for applying said modulating signal to said first cathode ray tube to reduce the intensity of light areas on the face of said first cathode ray tube which correspond to objects included in said record.

10. Apparatus for detecting moving objects in a region of fixed objects by radio waves comprising, means for directively radiating radio wave pulses, means for scanning said region while radiating said pulses, means for receiving wave pulses reflected from objects in the region being scanned, a cathode ray tube coupled to said receiver means to display on the face thereof by light areas the location of said objects, means producing a dark screen image of said region having dark areas corresponding to said light areas of said cathode ray tube display during a predetermined interval of time, and means for thereafter superimposing said dark screen image over a light screen image of said region whereby indications caused by reflected pulses from stationary objects are suppressed to make easier observations of indications of pulses reflected from moving objects.

11. Apparatus for detecting moving objects in a region of fixed objects by radio waves comprising, means for directively radiating radio-wave pulses, means for scanning said region while radiating said pulses, means for receiving wave pulses reflected from objects in the region being scanned, a cathode ray tube coupled to said receiving means for producing a light screen image of said region, means for providing a dark screen image of said region during a predetermined interval of time, and means for thereafter superimposing said dark screen image over said light screen image, whereby only indications of objects not present in said dark screen image appear in said light screen image.

12. A moving object indicator comprising, means for directively radiating radio wave pulses, means for scanning a predetermined area while radiating said pulses, means for receiving wave pulses reflected from objects in said area, a first cathode ray tube having means therein for producing a semi-permanent record of objects appearing in said area during a predetermined period of scanning, a second cathode ray tube coupled to said receiving means for producing a continuous indication of objects appearing in said area, light-sensitive means associated with said first cathode ray tube for producing a modulating signal in accordance with the location of objects appearing on said record, and means for applying said modulating signal to said second cathode ray tube effectively to eliminate the indication thereon of objects appearing on said record, whereby only indications of moving targets appear on said second cathode ray tube.

13. A moving object indicator comprising, means for directively radiating radio wave pulses, means for scanning a predetermined area while radiating said pulses, means for receiving wave pulses reflected from objects in said area, a first cathode ray tube having means therein operable when coupled to said receiving means for producing a semi-permanent record of the objects appearing in said area during a predetermined period of scanning, a second cathode ray tube coupled to said receiving means for producing a continuous indication of objects appearing in said area, means for uncoupling said receiving means from said first cathode ray tube, means thereafter causing a beam of light to scan said record in synchronism with said scanning means, light-sensitive means intercepting the light passing through said semi-permanent record, and means to utilize the output of said light-sensitive means to modulate the electron beam of said second cathode ray tube.

14. A moving target indicator comprising, means for directively radiating radio wave pulses, means for scanning a predetermined area while radiating said pulses, means for receiving wave pulses reflected from objects in said area, a first cathode ray tube coupled to said receiving means for producing a continuous indication of objects appearing in said area, a second cathode ray tube coupled to said receiving means for producing an identical indication of objects appearing in said area, a screen upon which has been made a dark record of the objects within said area when said record was made, means to position said screen in front of the face of said second tube with the objects appearing thereon aligned with the same objects appearing on the face of said second tube, light-sensitive means intercepting the light passing through said screen from said second cathode ray tube, and means to utilize the output of said light-sensitive means to modulate the electron beam of said first cathode ray tube.

15. A moving object indicator comprising, means for directively radiating radio wave pulses, means for scanning a predetermined area while radiating said pulses, means for receiving wave pulses reflected from objects in said area, a cathode ray tube having a first screen therein capable of being semi-permanently colored when bombarded by electrons, a fluorescent screen of short persistency disposed between said first screen and the other elements of said tube, means operable in synchronism with said scanning means for causing the electron beam of said tube to scan said fluorescent screen, means maintaining the velocity of electrons in said beam so that said electrons will penetrate said fluorescent screen and affect said first screen, means coupling said received energy to modulate said electron beam, whereupon dark spots are produced on said first screen corresponding to objects in said area, means thereafter decoupling said received energy from said tube, means to maintain said beam at a constant intensity, means to decrease the velocity of said electrons so as to cause said beam to affect said fluorescent screen but not said first screen, and means to cause the light passing through said first screen when said constant intensity beam is scanning said fluorescent screen to modulate the signal produced by said reflected radiation so as to reduce those parts of said signal corresponding to fixed objects within said area of scan.

MILTON G. WHITE.

References Cited in the file of this patent

UNITED STATES PATENTS

| Number | Name | Date |
|---|---|---|
| 2,183,634 | Zworykin | Dec. 19, 1939 |
| 2,189,549 | Hershberger | Feb. 6, 1940 |
| 2,209,191 | Dearing | July 23, 1940 |
| 2,289,978 | Malter | July 14, 1942 |
| 2,303,563 | Law | Dec. 1, 1942 |
| 2,409,448 | Rost | Oct. 15, 1946 |
| 2,410,424 | Brown | Nov. 5, 1946 |
| 2,422,135 | Sanders | June 10, 1947 |

FOREIGN PATENTS

| Number | Country | Date |
|---|---|---|
| 520,778 | Great Britain | May 3, 1940 |